April 24, 1945. H. A. NOYES 2,374,452
FRAMED COMESTIBLES IN FREEZING
Filed Nov. 30, 1939
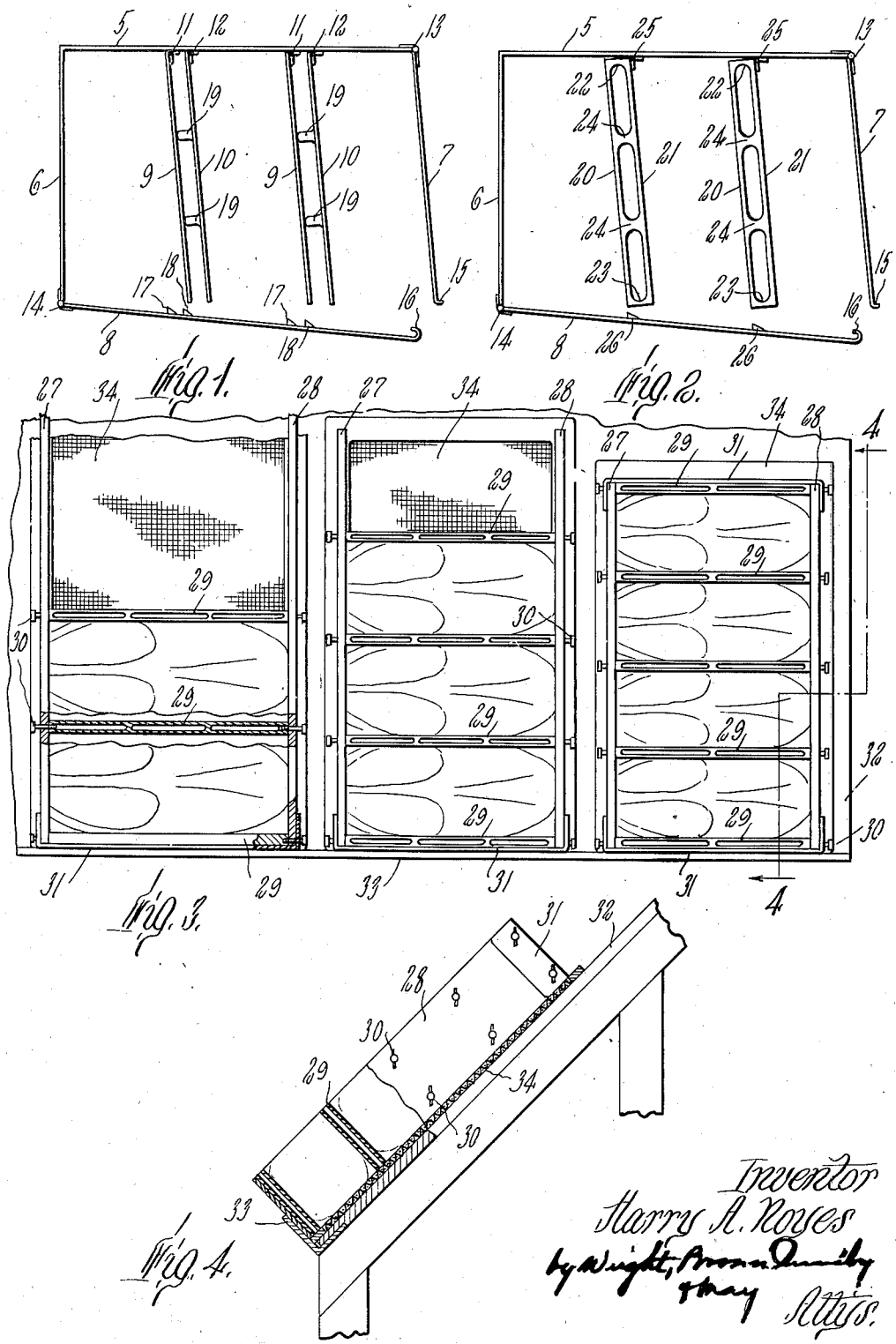

Patented Apr. 24, 1945

2,374,452

UNITED STATES PATENT OFFICE 2,374,452

FRAMED COMESTIBLES IN FREEZING

Harry A. Noyes, Newton, Mass.

Application November 30, 1939, Serial No. 306,820

2 Claims. (Cl. 99—194)

The methods of handling foodstuffs have changed with the advent of new freezing technics. Among recent advances in the use of the frozen state, as a means of producing higher quality comestibles, have been the development of special technics for handling eviscerated poultry. These are concerned with the cooling, eviscerating, wrapping, freezing, packing, low temperature storage and special marketing. Sometimes the freezing has been done before wrapping and one procedure for "quick freezing" freezes the poultry without the customary twenty-four hours of precooling. Appearance of frozen products is considered to have much to do with sales to wholesalers and retailers, therefore it is objective to have each "trade" box so packed that the birds have a uniform and attractive appearance.

It is the object of this invention to furnish equipment and procedures for bringing poultry and other comestibles to desired shapes and hold them to these shapes while the freezing operation is carried out.

Another object is to furnish a means for shaping and holding poultry or other products during freezing operations without the usual step of cooling to refrigerated temperatures before packing for freezing.

It is also an object to use framing, together with "quick freezing" to produce an attractive modified "New York dressed" pack.

Yet another object is to furnish convenient means for taking care of the different sizes and grades of poultry (birds) as they come along production lines without having to hold up packing pieces of a weight or grade until a dozen or so of a classification accumulate.

Other objects will be apparent as the equipment and procedures are described.

The usual poultry packing plant operations such as killing, plucking, waxing etc. are carried out while the birds, suspended by their feet, are transported along on a conveyor chain. The birds are then customarily roughly graded as they are transferred to portable storage racks. As soon as a rack is filled it is rolled into a refrigerated room, maintained at thirty-five to forty degrees Fahrenheit, under usual operating conditions. The birds cool to near the refrigerated room temperature in eighteen to twenty-four hours.

The cooled poultry is carefully graded to standards which include consideration of—weight, defects, size, plumpness, color etc. previous to evisceration. Eviscerating equipment varies in different plants. That considered best by many is of stainless steel. After the body cavity has been cleaned and the bird passed by inspectors, the neck, gizzard, liver and heart, usually wrapped, are placed back in the body cavity. The rather limp carcass is then prepared for wrapping and freezing. One representative procedure follows. The skin is folded over the neck opening: The wings are drawn back along the back until the tips are alongside the stern to which they are tied: The thighs are drawn back so as to effectively close the opening made to remove the entrails and they are also tied to the stern. This gives the carcass a trim, compact and plump appearance. The carcass is then wrapped in Cellophane, encased in a latex bag or protected by other suitable wrapping materials. Wrapped birds are frozen individually or packed in boxes and frozen by the boxful.

In one procedure it is considered preferable to take advantage of the quicker rate of freezing possible by having the birds unwrapped. If the birds are frozen singly by placing them in freezing chambers or rooms, each has its surfaces somewhat rounded and does not conform to the shape of the frozen bird against which it is later packed in the ordinary commercial shipping box. Boxes of such individually frozen birds "shuck" in transit with scrapping of the wrappings and ultimately the frozen birds. Special protections of paperboard etc., small individual display boxes for each bird have been resorted to with added expense. My invention economically overcomes these difficulties.

To illustrate further: It is general practice to pack a dozen birds of the same grade and size in a single box. Each bird varies a little physically from the others and therefore pushing, shoving etc. are resorted to in order to make a particular bird fit in or have a packed row of uniform appearance to the eye. Sometimes wrappings are torn in packing which detracts from the appearance of both the box and the individual bird. When the birds are packed side by side for freezing, some of each bird's surface is in contact with the surfaces of other birds alongside it or the side of the box. This cuts down not only the freezing rate but the uniformity of freezing of different portions of individual birds. Individual birds do not give alike when pressure is exerted on them in packing and one bird giving while the next one does not affects relative salability through the off appearance of some birds of equally good quality.

I have found that the number of box sizes required to pack poultry from small broilers up to and including large fowl may be markedly cut down by using my shaping frames during the freezing step. With my frames the freezing of one bird is not affected by any other. Also the number of square inches of packing box surface required for a bird of a certain forming frame size is always the same. With a particular breed of poultry in one locality, it figures out that all sizes and ages of birds could be handled in forming frames having openings of only four sizes.

It is not my purpose to claim invention of a single wall form for shaping a single bird or unit of comestible for freezing as that has been done with frames which press against the opposite sides of a bird and may or may not exert presssure in directions at right angles to the sides. I have also observed, in use, metal frames for holding several birds. These freezing frames were constructed so as to open at one or more corners and to press each bird into equal sized compartments by having a metal piece which went between each two birds. The frames were so constructed that they snapped or bolted into place as filled. I have found that uniformity of character and rate of freezing of all parts of birds in such freezing frames is absent because a portion of opposite sides of the metal surfaces used to shape and which separate birds are concurrently up against the flesh of the birds. Part of the surfaces of the birds therefore are not against metal on the opposite side of which the freezing agent extracts heat.

In accordance with this invention I provide freezing frames for shaping two or more birds or comestible bodies so that the freezing agent may flow in contact with at least one of the two wide faces of all metal parts, including those of the partitions between any two adjacent bodies. This involves making the intermediate partitions or separators of two metal plates with a space, or spaces, between them through which the freezing agent can flow freely in copious volume. The accampanying drawing shows some of the forms in which this feature or principle may be embodied.

In this drawing,

Fig. 1 is a plan view of one form of freezing frame having partitions or separators arranged in pairs, of which each member of the pair is separately connected by a hinge with one of the outer walls of the frame;

Fig. 2 is a similar view of a frame having double walled partitions each made as a structural unit;

Fig. 3 is a plan view of a plurality of frames different from one another in dimensions and of which the outer walls and separators are completely separable from one another;

Fig. 4 is a fragmentary side elevation of a bench adapted to support a number of frames side by side for the reception and forming of birds to be frozen.

In the form shown in Fig. 1, the frame is made of four outer walls designated 5, 6, 7 and 8, and intermediate partitions each composed of a pair of plates or walls 9 and 10 separately connected by hinges 11 and 12, respectively, with one of the outer walls, as the wall 5. All of the outer walls may be connected to one another by hinges, but in this illustration I have shown the walls 5 and 6 as integrally united at right angles to one another, the wall 7 being hinged at 13 to the end of the wall 5, and wall 8 being hinged at 14 to wall 6. The free margin of wall 7 is bent out to form a lip 15 and the free margin of wall 8 is rolled back to form a hook 16 adapted to be interlocked with the lip 15 to hold the frame closed, and to be disengaged for opening the frame to permit placement of the birds to be frozen and removal of the frozen bodies. The wall 8 is provided with abutments 17 and 18 adapted to retain the partition walls in parallel with the wall 6 when the frame has been loaded with bodies and closed.

All of these walls are made of plates of metal of suitable lengths with the partition plates suitably located, to provide compartments adapted to confine, under compression and with some flattening of their sides, the bodies of birds of a given size or grade. In height various frames may differ from one another according to the manner in which it is to be used in various freezing procedures. The height must be great enough to shape the birds properly, but preferably is not quite as great as the dimension of the framed bird from its back to the highest part. However, for situations where the frames are to be stacked after being loaded with birds, their height is preferably greater than the longest front to back dimension of the birds therein contained.

It will be apparent that the double partition walls, not only prevent the birds in adjacent compartments from touching each other, but also prevent two such birds from making contact with the same partition wall plate or member, and provide open spaces through which the freezing agent can flow in direct contact with one side of each member which is in contact at its other side with a framed bird. In order to prevent springing of the plates under the pressure of the confined bodies, and thus permit the use of thinner metal than would otherwise be necessary, I preferably provide spacing pieces or embossments 19, 19 connected to one of the plates of the pair and projecting into abutting contact with the other plate. Such spacers may be separate pieces inserted between the plates instead of being permanently attached to one of them.

Another form of the invention is shown in Fig. 2. Here each of the intermediate partitions is made as a structural unit consisting of parallel plates 20 and 21 connected to each other at a suitable distance apart by spacers 22 and 23 at or adjacent to their ends, and any desired number of intermediate spacers 24. Each of these unit partitions is connected to one of the outer walls of the frame, as wall 5, by a single hinge 25 and is locked in its holding position by a single abutment 26 on the wall 8. Otherwise the construction is the same as that shown in Fig. 1 and corresponding parts are designated by the same reference characters. This embodiment has the advantage over the one shown in Fig. 1 in that fewer parts need to be manipulated in loading the frame and shaping the bodies.

A form of frame, of which all the parts are separable from one another to permit storage in a small space when not in use, is shown in Fig. 3; and this figure likewise illustrates the fact that frames may be made of different dimensions to receive larger or smaller birds. In this case the frames are made of side walls 27 and 28, of a length as great as the combined width of a number of bodies and separators, together with a plurality of transverse end walls and partition walls 29 extending across between the side walls and detachably secured at their ends thereto. The intermediate transverse walls or separators are double walled units, which may be of the same construction as the partitions shown in Fig. 2; and the endmost walls may also be of the same construction. However, these end walls may be single plates, since they are exposed on the outside to the refrigerant when placed in the freezer. Various means may be employed to connect the side walls and transverse walls together, including bolts, pins, clamps or the like; and I have here shown by way of illustration bolts 30 which pass through holes in the side plates and are screwed into the adjacent separator members of the transverse walls, or into the edge of the end wall when such end wall is a solid plate. But the bolts may be threaded in the side pieces or, instead of bolts, pins without threads may be used. For additional security against separation of the parts, clamps or angle braces may be provided at the corners of the frame, and I have shown in Figs. 3 and 4 a clamp 31 which extends along the endmost transverse wall and around the adjacent corners and is held fast by the bolts which pass into the ends of the endmost transverse wall.

Any of the frames herein described, or their equivalent, may be placed singly, or a number of them side by side, on a table or bench, either directly on the top of the bench or on a screen. Fig. 4 shows a fragment of a bench having an inclined supporting top 32 on which the frames may be placed, and a ledge 33 at its lower edge to prevent them from slipping off. This figure shows the endmost frame of Fig. 3, partly in elevation and partly in section on the line 4—4 of Fig. 3 resting on a screen 34 which rests on the bench.

The following example illustrates using my new preferred shaping frames. An operator stands at a bench of the general type indicated in Figure 4. Wrapped eviscerated birds, graded etc. are brought to him. From experiences the operator knows the size of shaping frame proper to frame the first bird coming to him. He picks up a side and an end of a freezing frame and connects them, after which he slips the other side into place and fastens it. He next takes the bird and lays it in the forming frame, lengthwise in the end towards him. He picks up a separator. He brings the separator, on edge, up against the side of the bird and, as he draws the separator up into position, shapes the bird to the form desired. The separator is then fastened in place. The next bird is handled in the same way unless it is of a different framing size or grade, in which case, it is put in another forming frame. The usual bench holds several frames and is fitted with shelf space or other holders on which parts for the forming frames—of all sizes—are readily available. To prevent a freezing frame from spreading before the far end is in place any one of a number of convenient devices may be employed. When a forming frame of comestibles is filled it, together with the wire frame on which it rests, either alone or with other loaded forming frames, is sent along to the freezer.

The use of shaping and freezing frames goes naturally with the employment of "quick freezing" procedures. "Quick freezing" takes comparatively so little time, compared to slow or sharp freezing, that a forming frame may be used several times in the same day.

If brine or other liquid freezing agents are employed the bird will not be frozen to the frame as it comes from the freezing chamber. I prefer removing the frozen birds from the forms without washing off the brine. Forming frames are easily treated so that the comestibles or wrappings will not stick to them in air freezing procedures.

In my development of improvements in the food arts, I have sought for the reasons as to why most of the dressed poultry in the United States is packed by what is termed, by the "trade," as "New York dressed." A number of reasons were found as, for example, that eviscerated poultry exposes large areas in the body cavity to drying; that—in the unfrozen state—the lining of the body cavity provides almost perfect media for the growth of many kinds of deteriorating micro-organisms; again it has been found that a properly dressed bird—with the skin entire—offers resistance to deterioration and finally it has been observed that there is resistance by consumers to the much higher prices per pound for eviscerated poultry under standards that require prices to be per pound and not per individual bird.

The amount of poultry frozen each year is enormous and the methods followed in freezing most of it can not be claimed as "quick." It is the rule, in prior art practices, for the birds to have been killed from at least one to several days before they go into the freezer. If the bird is allowed to "cool out" and then eviscerated the day after killing, or later, I find that the harm to flavor which is often termed "guttiness" has already taken place.

In frozen storage there develops what is termed "freezer burn," which is an uneven drying of the skin, first about points from which the feathers were drawn, called "pocking" and then later as larger blotches. This drying causes losses of weight and eventually makes the birds quite unsightly. Under such conditions there is a change of color that slowly takes place in the body cavities of eviscerated birds and lowers their value as food. It has also been noted that defrosting of eviscerated birds is not as sanitary under usual practices.

It has been my objective to have poultry frozen so as to retain, as nearly as possible, its "natural" characteristics. This has led to finding out what it is that causes the so called "gutty" flavors of portions of both eviscerated and uneviscerated birds, how this can be prevented and better packs, that appeal to the "trade" produced.

I have found that if "quick freezing" is carried out shortly after killing there is practically no development of "gutty" flavors in uneviscerated birds and therefore have combined this in steps giving a modified "New York dressed" pack that is distinctive and which should win general approval. I take advantage of the trim appearance that has been worked out for eviscerated birds by tying the legs and wing tips back to the stern.

As a specific example, the poultry is being frozen inside a period of four hours after killing. Selected poultry is killed, bled, semiscalded, rough picked, waxed pinfeathered etc. without having the temperature of the water or wax high enough to harm the "natural" characteristics of the skin. The birds are graded, the feet and lower portions of the legs are removed, the legs and wing tips are tied back, the birds are weighed, etc. The birds are then wrapped and placed in the forming frames or, if so desired are formed without wrapping.

As an example of a quick freezing procedure, birds are frozen with a heavy volume of brine (sodium chloride) freezing solution per square foot of freezing belt surface maintained at, at least fifteen degrees Fahrenheit below the freezing point of the birds. This gives frozen birds, as a rule, in less than six hours from the time that they were killed. The frozen birds are removed from the freezing forms in a room held several degrees below their freezing point. From this point on variations are made. If the freezing has been done with ample volume of the freezing solution there is virtually no penetration of the birds by the solution although there is a film of liquid on the surfaces of the frozen birds. The freezing of the poultry is finished at this point. Three variations in handling this modified "New York dressed" to carry the high quality tasty poultry through the frozen storage period follow.

One, the frozen birds, as taken from the forming frames, are held, for a time, at temperatures below the freezing points of the birds to allow for thorough draining. They are then wrapped. If wrapped in latex bags, the bags may be shrunk to the birds by dipping the encased birds in warm water with temperatures and timings that return "natural" appearance to the skin.

I find that bringing back the "natural" appearance of the skin can be postponed until the birds are defrosted, eviscerated etc. in preparation for immediate use by consumers.

Two, the frozen birds, after removal from the forming frames, are treated—first, with water to bring the skin back to its "natural" appearance; second, the skin is rehardened with the retention of its natural appearance; third, the bird, while below its freezing point throughout, is encased in a latex bag by approved procedures and lastly packed in proper boxes for freezer storage. (Other wrappings than latex bags may be used.)

Three, the frozen birds are removed from the forming frames treated with—first, water to bring the skin back to its natural appearance; second, the skin is allowed to refreeze so as to retain its natural appearance; third, the surfaces are coated with ice by spraying or otherwise applying ice water to them, and lastly the birds are packed in proper boxes and placed in freezer storage. A variation of this is to pack the birds in the boxes after the skin has been brought back to natural appearance and rehardened. The whole box of birds is then coated with the protecting coating of ice. The ice, in this procedure, is constantly subliming in the zero storage and so its amount or the time in storage have to be regulated if quality is to be maintained equal to variations one or two, above.

I have discussed and given illustrations of my inventions. To make explanations and practices clearer I have gone briefly into certain practices of the prior arts. It is my accomplishment to have discovered procedures that retain the "natural" characteristics to a greater extent than prior practices. I have indicated that in some previous methods there has neither been contact enough with not enough of the freezing solution. I have left methods of handling the frozen poultry after it is placed in "freezer" storage as another development for such matters are concerned with the preservation and utilization of what has been produced by the freezing and packing operations.

It is to be understood that my invention is not limited to the specific products, apparatus and materials described, but is susceptible to various modifications.

I claim:

1. The method of preserving poultry, which comprises taking freshly killed dressed birds, within four hours after killing and while they still retain a substantial proportion of their body heat, confining such birds with pressure between confining members which have high heat conductivity, in an assemblage having open spaces intermediate the members which confine adjacent birds, causing a freezing fluid at a low enough temperature and in adequate volume to effect quick freezing to flow in thermal contact with exposed surfaces of the birds and through said intermediate spaces in contact with said confining members, continuously until the birds are substantially frozen.

2. The method of preserving poultry, which comprises placing a plurality of freshly killed dressed birds while still warm in a frame with spaced apart metal partitions between each two birds, at the same time causing pressure to be exerted between the birds and said partitions sufficient to produce extended surface contact, causing a freezing liquid at a temperature low enough and in volume great enough to effect quick freezing to flow over the exposed surfaces of the framed birds and through the spaces between the spaced apart partitions in contact with the surfaces thereof opposite to those surfaces which are in contact with the birds, for a sufficient time to freeze the birds, removing the frozen birds from the freezing liquid and the frame, draining excess liquid from the birds, wrapping the birds while frozen, and placing them in cold storage at a temperature below their freezing point.

HARRY A. NOYES.